United States Patent [19]

Habib

[11] Patent Number: 5,687,937

[45] Date of Patent: Nov. 18, 1997

[54] HOSE ORGANIZER

[76] Inventor: Amin E. Habib, 9036 Owensmouth Ave., Canoga Park, Calif. 91304

[21] Appl. No.: 578,948

[22] Filed: Dec. 27, 1995

[51] Int. Cl.$^6$ .................................................. F16L 3/00
[52] U.S. Cl. .................................................. 248/51; 248/91
[58] Field of Search .............................. 248/49, 51, 91, 248/798.1, 317, 58, 214, 215, 534

[56] References Cited

U.S. PATENT DOCUMENTS

| | | | |
|---|---|---|---|
| 941,410 | 11/1909 | Trask | 248/91 |
| 984,060 | 2/1911 | Allen | 248/91 |
| 3,289,983 | 12/1966 | Mennerdahl | 248/58 |
| 4,646,997 | 3/1987 | Fadley | 248/317 |

*Primary Examiner*—Leslie A. Braun
*Assistant Examiner*—Willie Berry, Jr.
*Attorney, Agent, or Firm*—Jack C. Munro

[57] ABSTRACT

A hose organizer which includes an elongated rail which is to be horizontally mounted on a wall surface and spaced above a floor. There is to be mounted a plurality of carriers on the elongated rail. The carriers are to be low frictionally movable on the elongated rail. Each carrier includes a pair of hose connections with a separate length of hose to be connected to each hose connection. The first length of hose is to be connected to a source of air pressure. The last length of hose is to be connected to a tool with the tool to be operated by air pressure from within the hose.

2 Claims, 3 Drawing Sheets

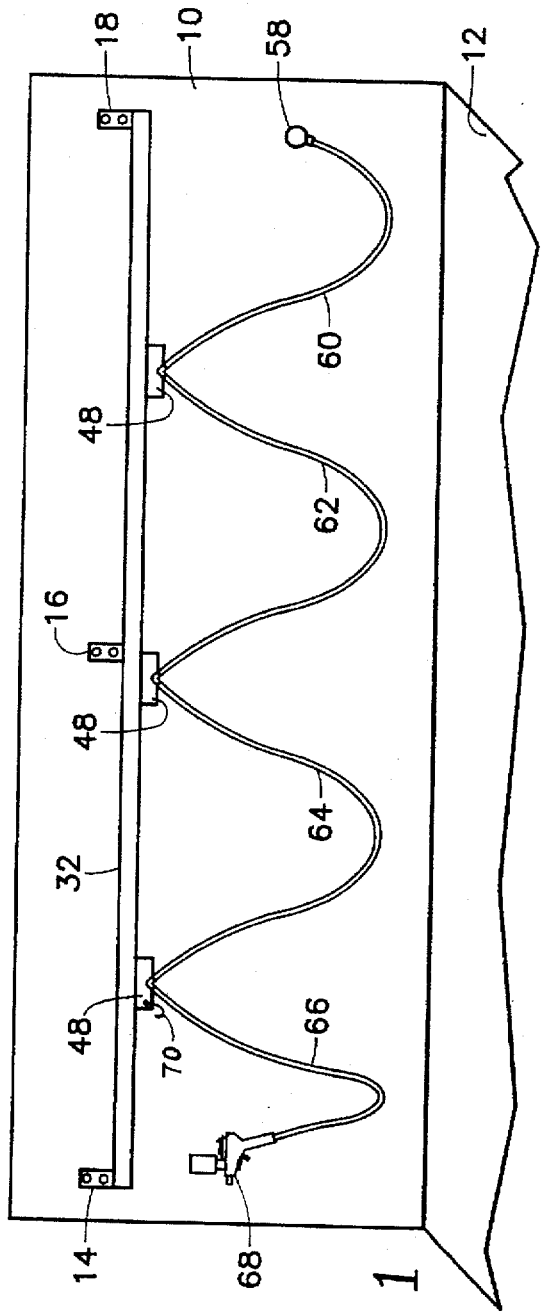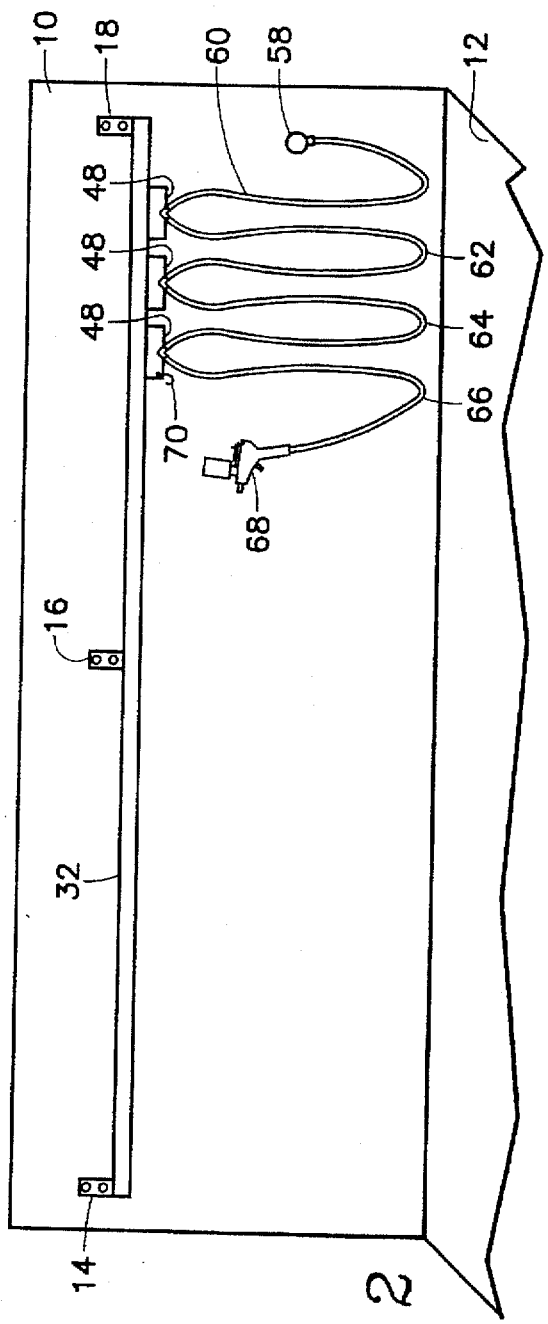

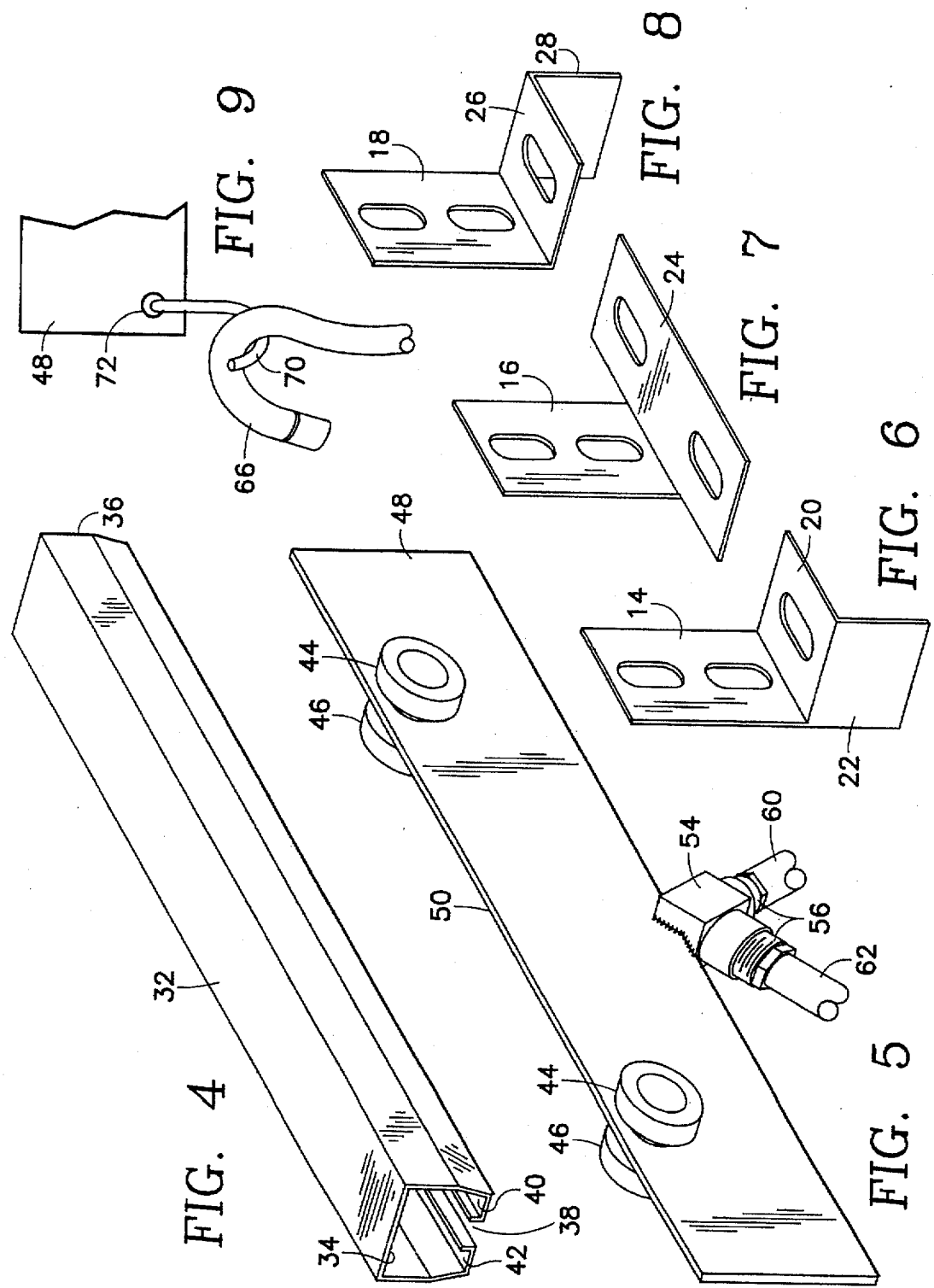

HOSE ORGANIZER

BACKGROUND OF THE INVENTION

1) Field of the Invention

The field of this invention relates to tools and more particularly to a tool which is operated by air pressure from a hose with this hose to be movably mounted on a wall surface thereby eliminating movement of the hose across a floor.

2) Description of the Prior Art

The subject matter of this invention is being discussed in relation to a hose and more particularly to an air pressure hose. However, it is considered to be within the scope of this invention that it could be used on other types of hoses such as a liquid conducting hose.

Air hoses are in exceedingly common usage in conjunction with air operated tools. One particular example of an air operated tool would be a paint gun. Paint guns are commonly used within vehicle body shops to apply a thin, precise layer of paint onto the body of an vehicle. A common procedure would be for the hose that connects between the source of pressurized air and the paint gun to be merely located on the floor of the painting booth. As the operator moves around the vehicle the hose will be dragged across the floor.

It is common to have the hose become entangled with the tires of the vehicle or other structure that is mounted on the floor. Any entanglement will result in a pull-back force on the paint gun. This pull-back force frequently materially affects the quality of the application of the paint to the vehicle. The pull-back force will cause less paint to be applied in some areas, and a greater amount of paint to be applied in other areas. Also, the hose frequently becomes twisted which requires that the user constantly untwists the hose. The applying of paint to a vehicle requires complete freedom of movement and fast maneuvering of the paint gun. With the air hose dragging across the floor of the paint booth, it is not possible to have complete freedom of movement and fast maneuvering is frequently hindered when the paint gun becomes entangled.

SUMMARY OF THE INVENTION

The primary objective of the present invention is to mount an air hose and tool in an out of the way position thereby substantially eliminating any possibility of the air hose becoming entangled with the using of the tool.

Another objective of the present invention is that by using of the hose organizer of this invention, the use of certain tools such as a paint gun to paint an object is facilitated by decreasing the amount of time that it takes to paint that object.

Another objective of the present invention is that by using of the hose organizer of this invention that substantially increased freedom of movement is achieved in using of the tool that is connected to the hose organizer.

Another objective of the present invention is that the organizer permits for fast maneuvering of the tool when being used.

Another objective of the present invention is to provide for complete control of the air hose and since the air hose does not come into contact with the floor, it is kept completely clean since it does not come into contact with foreign material.

The hose organizer of this invention is constructed of one or more elongated rails. Generally there will be a plurality of carriers low frictionally movably mounted on each rail. Each carrier includes a pair of hose connections. The first length of hose, which is from a source of pressurized air, is conducted to the first carrier and then from that carrier is a second length of hose which goes to the second carrier and from the second carrier is a third length of hose that goes with the third carrier, and so forth. The last carrier has a length of hose which connects to an air tool. The elongated rail is horizontally mounted on a wall surface generally four to six feet off the floor. The tool to which the last length of hose is connected can be operated with complete freedom of movement about an object to perform work. Walking of the tool relative to the object will result in the hose automatically following the user because of the low frictional connection in conjunction with the rail. It is to be understood that if the organizer of this invention is used within a booth, there will be a separate rail and hose arrangement mounted on each sidewall of the booth.

BRIEF DESCRIPTION OF THE DRAWINGS

FIG. 1 is a front elevational view of the hose organizer of the present invention showing the hose organizer in an expanded configuration;

FIG. 2 is a view similar to FIG. 1 but showing the hose organizer in the condensed configuration;

FIG. 4 is an isometric view of the elongated rail as it used in conjunction with the hose organizer of the present invention;

FIG. 5 is an isometric view of the carrier that is utilized in conjunction with the hose organizer of the present invention;

FIG. 6 is an isometric view of a mounting bracket for the left end of the elongated rail of the hose organizer of the present invention;

FIG. 7 is an isometric view of an intermediate mounting bracket utilized in conjunction with the hose organizer of the present invention;

FIG. 8 is an isometric view of the bracket to be used in conjunction with the right end of the elongated rail of the hose organizer of the present invention; and FIG. 9 is a view of a modification of a carrier which is supported by the elongated rail of the organizer of the present invention showing the carrier including a hook for connecting to the last in a series of hoses when the hose is not connected to a tool.

DETAILED DESCRIPTION OF THE PREFERRED EMBODIMENT

Figure 3:
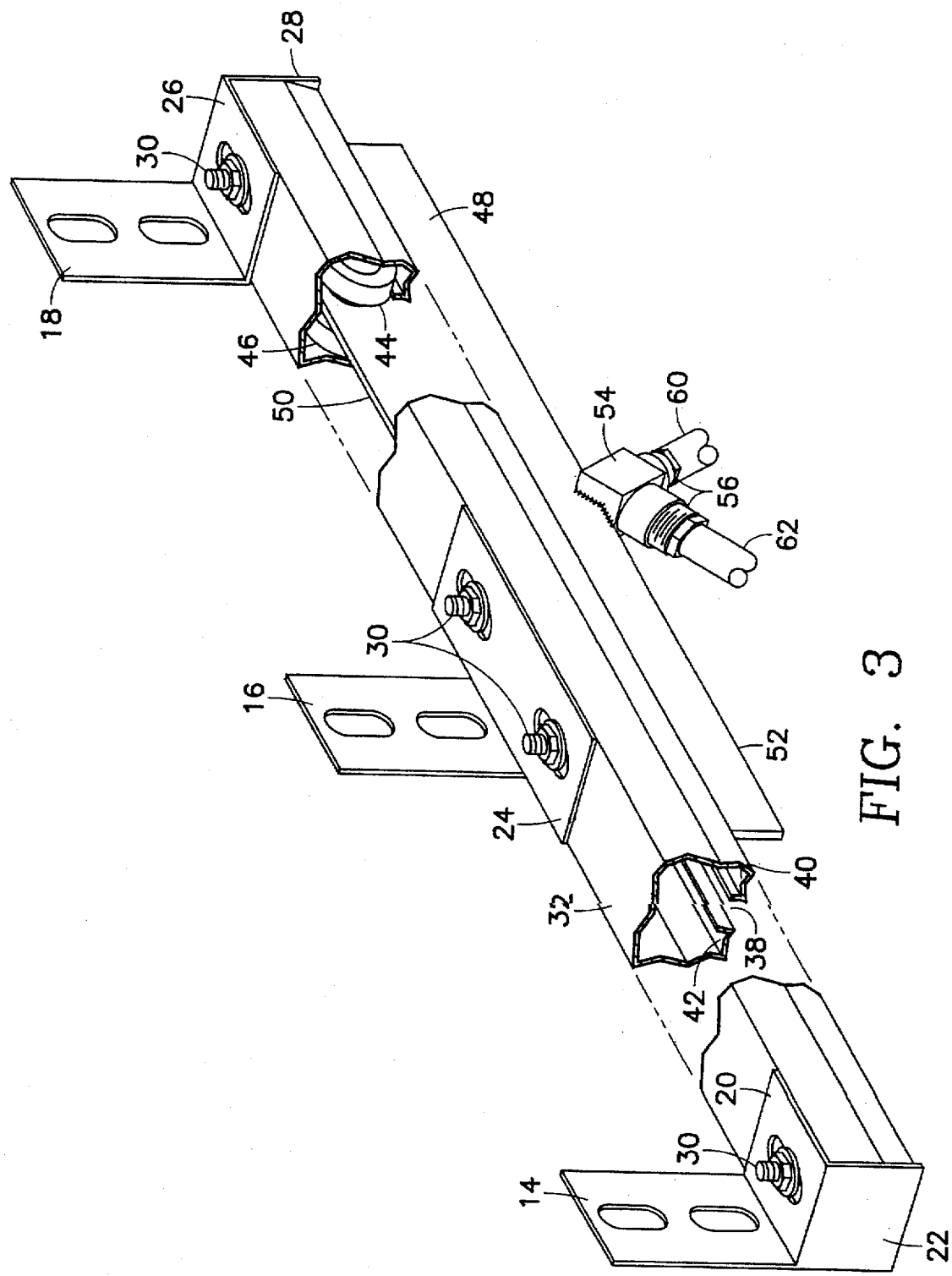
FIG. 3 is an isometric view, partially cut away, of the elongated rail utilized in conjunction with the hose organizer of the present invention showing a carrier being connected with the elongated rail.

Referring in particular to the drawings, there is shown a wall surface 10 which connects at its lower end to a floor 12. Fixedly mounted by appropriate fasteners such as bolts or screws on the wall 10 is a left end bracket 14, an intermediate bracket 16 and a right end bracket 18. It is to be understood that the brackets 14, 16 and 18 are spaced apart. It is also to be understood that there may be included more than one intermediate bracket 16 on the wall 10.

The left end bracket 14 includes a top plate 20 and an end plate 22. The intermediate bracket 16 includes a top plate 24. The right end bracket 18 includes a top plate 26 and an end plate 28. There are appropriate holes formed with the top plates 20, 24 and 26 that are to connect with appropriate bolt fasteners 30 for the purpose of securing the elongated rail 32 to the top plates 20, 24 and 26. The left open end 34 of the elongated rail 32 is to be closed by the end plate 22. The right open end 36 of the rail 32 is to be closed by the end plate 28. The elongated rail 32 can be made of any desired length and will normally be constructed of a metallic material such as steel. The elongated rail 32 includes an elongated slot 38 formed with its lower end thereof dividing the elongated rail 32 into a forward track 40 and a rearward track 42. A pair of spaced-apart rollers 44 are mounted in the forward track 40. A similar pair of spaced-apart rollers 46 are mounted in the rearward track 42. The rollers 44 and 46 include low frictional bearings so that the rollers 44 and 46 can ride freely within their tracks 40 and 42, respectively. Each roller 44 is connected to a roller 46 by a shaft (not shown). That shaft is fixedly mounted within a hole formed within a carrier 48. That carrier 48 generally constitutes a piece of sheet metal. The rollers 44 and 46 are located directly adjacent the upper edge 50 of the carrier 48. Weldingly secured to the lower edge 52 of the carrier 48 is a fitting 54. Fitting 54 includes an internal passage (not shown) which connects between a pair of hose connections 56.

Fixedly mounted into the wall 10 is a fitting 58. The fitting 58 is to connect to a source of pressurized air (not shown). From the fitting 58 there extends a first length of flexible hose 60 which is to connect with the fitting 54 mounted on the first in a series of the carriers 48. A second length of hose 62 extends from the fitting 54 and connects to the next in the series of carriers 48. From that carrier 48 there is a third length of hose 64 which in turn connects to the last in the series of carriers 48. From that carrier 48 there extends a final length of hose 66. That hose 66 is connected to a tool 68. A typical tool would be a paint gun. However, any air operated tool could possibly be used in conjunction with the organizer of this invention.

It is thus to be seen that the user only needs to manually pick up the tool 68 and walk the entire length of the wall 10 with complete freedom of movement with the lengths of hose 60, 64 and 66 readily moving from the expanded position shown in FIG. 1 to the condensed configuration shown in FIG. 2. It is to be understood that for some installations there may be fewer in number of the carriers 48 or perhaps a greater number of carriers 48. In the condensed configuration, the carriers 48 might abut each other and in the expanded configuration shown in FIG. 1, the carriers 48 will be spaced apart. Within a paint booth it is to be understood that the organizer shown in FIG. 1 will be located on each sidewall of the paint booth. The paint gun 68 could be disengaged from the organizer on one wall 10 and then reengaged with the organizer on the opposite wall. Also, there could be utilized a complete separate paint gun in conjunction with the organizer on the opposite wall.

If the tool 68 is disconnected from the last in a series of hoses 66, it would be desirable to keep that hose 66 from falling in contact with the floor 12. In order to do so, the open end of the hose 66 is to be draped over hook 70 with this hook 70 being mounted within a hole 72 formed within the last of the series of carriers 48.

What is claimed is:

1. A hose organizer comprising:

an elongated rail adapted to be horizontally mounted on a wall surface spaced above a floor, said elongated rail having an elongated slot, said elongated slot dividing said elongated rail into a forward track and a rearward track; and at least one carrier mounted on said elongated rail, said carrier connecting with and protruding exteriorly of said elongated slot, said carrier being capable of low frictional movement on said elongated rail by said carrier including a first pair of spaced-apart rollers mounted for rolling movement in said forward track and a second pair of spaced-apart rollers mounted for rolling movement in said rearward track, said carrier including a first hose connection and a second hose connection, said first hose connection connecting with a first length of hose, said second hose connection connecting with a second length of hose, pressurized air to be conducted though said first length of hose into said first hose connection and then into said second hose connection and into said second length of hose, whereby said first length of hose is to connect with a tool permitting movement of the tool along the wall surface without either said first or second length of hose coming in contact with the floor and said second length of hose to connect with a source of pressurized air.

2. The hose organizer as defined in claim 1 wherein:

there being a plurality of said carriers mounted on said elongated rail with each said carrier including a pair of hose connections, each said hose connection of said pair of hose connections connecting with a length of hose.

\* \* \* \* \*